(12) United States Patent
Rule et al.

(10) Patent No.: US 12,147,983 B2
(45) Date of Patent: Nov. 19, 2024

(54) SYSTEMS AND METHODS FOR MULTI-FACTOR AUTHENTICATION USING DEVICE TRACKING AND IDENTITY VERIFICATION

(71) Applicant: Capital One Services, LLC, McLean, VA (US)

(72) Inventors: Jeffrey Rule, Chevy Chase, MD (US); Kevin Osborn, Newton Highlands, MA (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 26 days.

(21) Appl. No.: 18/096,881

(22) Filed: Jan. 13, 2023

(65) Prior Publication Data

US 2024/0242221 A1    Jul. 18, 2024

(51) Int. Cl.
  *G06Q 20/40*   (2012.01)
(52) U.S. Cl.
  CPC ....... *G06Q 20/4015* (2020.05); *G06Q 20/409* (2013.01)
(58) Field of Classification Search
  CPC .......... G06Q 20/4015; G06Q 20/409
  USPC ........ 705/44
  See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Pourghomi, Pardis et al., A Proposed NFC Payment Application, 2013, International Journal of Advanced Computer Science and Applications, vol. 4, No. 8. (Year: 2013).*

(Continued)

*Primary Examiner* — Scott C Anderson
*Assistant Examiner* — George N. Proios
(74) *Attorney, Agent, or Firm* — KDW Firm PLLC; Andrew D. Kasnevich

(57) ABSTRACT

Systems and methods are directed to a modified device configuration for disposing a NFC compatible user card within a NFC field of a user mobile device so as to enable continuous proximity monitoring based on a status of an NFC link established between the card and the mobile device. The modified device configuration may be utilized to implement card tracking functionality by using a mobile application, running on the mobile device, to generate a timestamp upon detection of change in a connectivity status of the NFC link to the card. The timestamp NFC connectivity data may then be paired with mobile device GPS coordinates, concurrently retrieved from one or more mobile GPS-based navigation applications, to facilitate card tracking functionality as well as multi-factor validation for electronic transactions initiated by the NFC compatible card and/or the mobile device.

20 Claims, 8 Drawing Sheets

(56) References Cited

U.S. PATENT DOCUMENTS

| | | | |
|---|---|---|---|
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |

(56) References Cited

U.S. PATENT DOCUMENTS

| | | |
|---|---|---|
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2* | 5/2015 | Khalid ............... G06Q 30/3278 |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,117,242 B1 | 8/2015 | Ellis et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2* | 12/2015 | Royston ............... H04B 5/0043 |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2* | 4/2018 | Candelore et al. .. G06Q 20/405 |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |

(56) References Cited

U.S. PATENT DOCUMENTS

| | | |
|---|---|---|
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0013499 A1 | 1/2013 | Kalgi |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0081349 A1 | 3/2015 | Johndrow et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |

(56) References Cited

U.S. PATENT DOCUMENTS

| | | |
|---|---|---|
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1* | 3/2016 | Shah et al. ............... H04L 63/08 |
| 2016/0092696 A1 | 3/2016 | Guglani et al. |
| 2016/0148193 A1* | 5/2016 | Kelley et al. ......... G06Q 20/352 |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0262942 A1 | 9/2017 | Gaddam et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0114216 A1 | 4/2018 | Joseph et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2022/0084032 A1 | 3/2022 | Koehler et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved

(56) References Cited

OTHER PUBLICATIONS from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
The International Search Report and Written Opinion mailed Apr. 17, 2024, for corresponding PCT/US24/11389 (eight (8) pages).

\* cited by examiner

SYSTEMS AND METHODS FOR MULTI-FACTOR AUTHENTICATION USING DEVICE TRACKING AND IDENTITY VERIFICATION

FIELD OF THE DISCLOSURE

The present disclosure is generally related to device proximity detection based on near field communication, and more specifically to the implementation of device tracking and identity verification functionalities based on device proximity detection for multi-factor authentication.

BACKGROUND

Electronic transactions, initiated by a smart card and/or a mobile device application, generally involve a single factor of authentication based on verification of data stored on the card and/or transmitted in the transaction request message. With the ubiquity of smart phones, some authentication approaches have incorporated a secondary user device verification routine into the authentication process, by requiring a user to verify a card-initiated transaction via a corresponding user mobile device, as an additional security measure towards fraud prevention.

However, these approaches involve user-provided identification data inputted via a secondary device and are hampered by limited scope of authentication security. In addition, implementation that is contingent upon user-provided input authentication information may be sup-optimal for purposes of security and the user experience.

These are other deficiencies exist. Accordingly, there is a need for systems and methods implementing secure, user-friendly multi-factor authentication.

SUMMARY OF THE DISCLOSURE

One aspect of the present disclosure is directed to an implementation of multi-factor transaction authentication based proximity monitoring of a user card by a mobile application. The process may be facilitated by an external card storage component which disposes the card within a Near Field Communication (NFC) field of a mobile device running a link monitoring and location tracking application. As such, one aspect of the proposed solution may be directed to a method comprising the step of: providing a mobile device associated with a user, with an external card pocket, structured to store a user card within a Near-Field communication (NFC) field of the mobile device, monitoring, by a user application stored on the mobile device, a connectivity status of an NFC link established between the user card, disposed in the card pocket, and the mobile device, generating one or more event timestamps associated with one or more detection events, wherein each detection event corresponds to a change in the connectivity status of the NFC link, comparing, by a validation process, a most recent event timestamp from the one or more event timestamps, with a transaction timestamp associated with a transaction request message for a transaction initiated by the user card, wherein the one or more event timestamps are transmitted to the validation process by the user application, verifying that the transaction timestamp does not exceed the most recent event timestamp by more than a predefined threshold value, wherein the most recent event timestamp corresponds to a removal of the card from the card pocket.

In accordance to some embodiments of the present disclosure, the method may further comprise recording a Global Positioning System (GPS) location coordinates corresponding to a GPS location of the mobile device, at each of the one or more event timestamp. The validation process may then generate a multi-factor strong transaction validation response based on the verification of a merchant location from a GPS location of the mobile device associated with the most recent event timestamp, and the comparison of the most recent event timestamp with the transaction timestamp.

One aspect of the present disclosure is directed to a system for implementing multi-factor transaction authentication based on device proximity monitoring and location tracking, the system comprising a structural element for storing a user card within a Near-Field communication (NFC) range of a mobile device running a user application, the system further comprising a computer hardware arrangement configure to: monitor, by the user application stored on the mobile device, a connectivity status of an NFC link established between the user card, when stored in the structural element, and the mobile device, generate one or more event timestamps associated with one or more detection events, wherein each detection event corresponds to a change in the connectivity status of the NFC link, compare, by a validation process, a most recent event timestamp from the one or more event timestamps, with a transaction timestamp associated with a transaction request message for a transaction initiated by the user card, wherein the one or more event timestamps are transmitted to the validation process by the user application. The system may then verify that the transaction timestamp does not exceed the most recent event timestamp by more than a predefined threshold value, wherein the most recent event timestamp corresponds to a removal of the card from the card pocket. Upon verifying that a time interval associated with the removal of the card from the card pocket does not exceed a predetermined threshold value, the system may generate a two-factor strong validation response for the transaction request message based on verifying proximity of the user card to the mobile device.

In accordance to some embodiments of the present disclosure, the system may further be configured to record a Global Positioning System (GPS) location coordinates corresponding to a GPS location of the mobile device, at each of the one or more event timestamp. The system may then generate a multi-factor strong transaction validation response based on the verification of a merchant location from a GPS location of the mobile device associated with the most recent event timestamp, and the comparison of the most recent event timestamp with the transaction timestamp.

One aspect of the present disclosure is directed to a non-transitory computer-accessible medium having stored thereon computer-executable instructions for implementing multi-factor transaction authentication based on card proximity and location tracking data.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

In one aspect, the disclosed systems and methods aim to enhance the fraud prevention utility of contactless one time password (OTP) card transactions by including an addition layer of authentication security to the corresponding back-end validation process. The enhancement is facilitated by maintaining a continuous Near Filed Communication (NFC) contact between a mobile device and the contactless card using an external cardholder attached to the mobile device. This enables the mobile device to report the location of the card to a back-end validation process based on the detected status of the NFC link. The proposed arrangement comprises a mobile device with a cardholder pocket for storing a contactless OTP card within a NFC range of the mobile device reader which enables back-end tracking of the card activity with respect to its proximity with a secondary user device (e.g., the mobile phone). This provides a second factor of authentication for transaction conducted with the contactless OTP card without requiring a secondary authentication input from the user.

The disclosed physical arrangement and operational configuration for operating a contactless OTP card withing an NFC range of a mobile communication device (e.g., by using a cardholder pocket overlapping a communication field emanating from a reader of the mobile communication device) also provides active reporting of the card location based on an ON/OFF status of the NFC link, (e.g., corresponding to the insertion and removal of the card from the cardholder) which further provides a card tracking utility in case of a lost and/or stolen card.

Figure 1A:
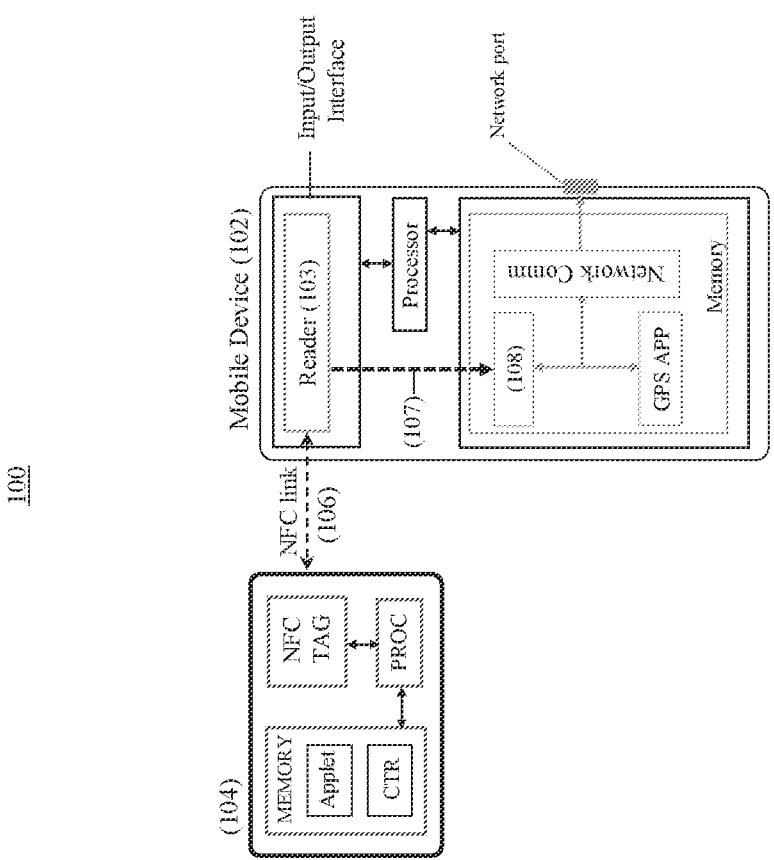
FIG. 1A illustrates an exemplary interaction between a contactless card and a mobile device based on continuous short-range link monitoring, in accordance to some embodiments of the present disclosure.

FIG. 1A illustrates an overview of the interaction between a mobile device (102) and a user card (104). The communication between the two devices (e.g., the mobile device (102) and the card (104)) is proximity-based and is enabled across a NFC link (106) which is established as the user card (104) enters an NFC field generated by, for example, the reader component (103) of the mobile device (102). An NFC tag on the user card may then communicate with the mobile device when in NFC proximity of the Mobile device reader. A corresponding user application (108) running on the mobile device may then receives and process the NFC transmitted data. The NFC field can be generated by a mobile device (e.g., a smartphone), a point-of-sale device, or other devices. The data (107) retrieved by the user application (108) may correspond to a connectivity status of the NFC link (106), which conveys either an active or an inactive status signifying that the card is present or not present within proximity of the mobile device (102).

Figure 1B:
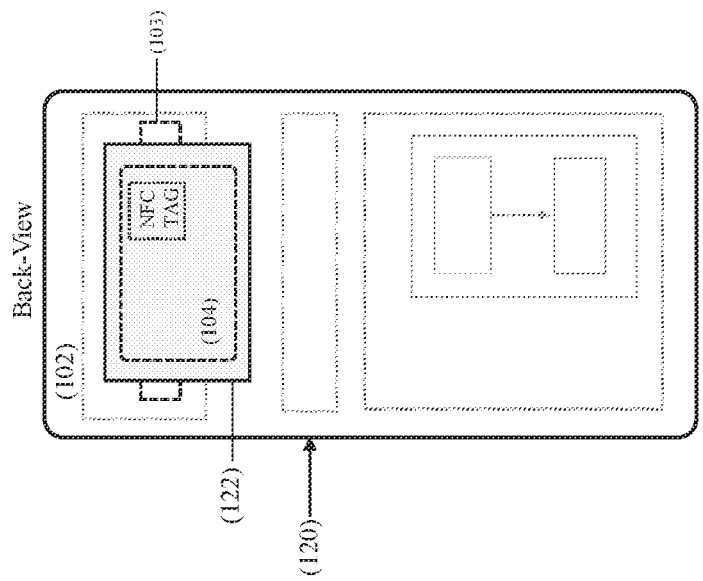
FIG. 1B illustrates an exemplary structure with a card pocket arrangement for enabling interaction based on continuous short-range link monitoring, in accordance to some embodiments of the present disclosure.

FIG. 1B illustrates an exemplary back-view illustration (125) of a modified device (120) comprising a mobile device accessory, featuring a card storage compartment and/or pocket (e.g., card holder/storage component (122)) that stores an NFC-readable card (104) and may be utilized for operationally integrating the user mobile device (102) with the user card (104). For example, an active or inactive status of the NFC link (106) may signify that the card (104) is present or not present within the cardholder (122). A change in the connectivity status of the NFC link (106) from inactive to active may correspond to insertion of the user card (104) into the card pocket (122). Similarly a change in the NFC link status from active to inactive may correspond to removal of the user card (104) from the card pocket (122). The corresponding configuration may then be used to implement proximity monitoring/card tracking and multi-factor transaction authentication functionalities (e.g., for electronic transactions initiated by either the card or the mobile device.) In some embodiments, the card pocket may correspond to an external storage component affixed to the mobile device and structured to dispose the user card within a near-field communication (NFC) field of the mobile device. Accordingly, the (external) card storage component (also referred to as the card pocket) may be structurally configured to dispose the NFC tag of the user card (104) in an optimal orientation for establishing a proximity-based NFC link (106) with the NFC reader (103) of the mobile device (102). As shown in the exemplary back-view illustration (125) of the modified device (120) with the card holder/storage component (122), the user card (104), when stored in the card pocket (122), is oriented in such a way that the NFC tag of the card overlaps the NFC reader (103) of the mobile device (102). Accordingly, an active proximity-based NFC signal is established between the user card (104) (e.g., integrated NFC tag of the card) and the mobile device (102) (e.g., NFC reader component of the mobile device). The back-view (125) illustrate the overlay of the NFC tag with the mobile device NFC reader.

In some embodiments, the user card (104) stored in the card pocket (106), may correspond to a contactless card. The contactless card may comprise an integrated processor and memory that may store, for example, user identifying and/or authenticating information as near field communication (NFC) transmittable data (e.g., NFC Data Exchange Format (NDEF)). The integrated memory may store one or more applets that may be communicatively coupled to one or more applications (e.g. application 107) running on the user mobile and/or computing device (102) as well as one or more applications stored on a corresponding application server. The card-integrated memory may also store an application transaction counter (CTR) to keep track of a proper sequence of operations associated with a transaction conducted using the contactless card. The contactless card may further comprise a Near Field Communication (NFC) interface (e.g., NFC TAG) to facilitate NFC communication with an NFC reader (e.g., reader component (103) of the mobile device (102)). The user authentication information may then be directly captured by the reader component of the mobile user device by bringing the contactless card within an NFC range of the mobile device (e.g., by storing the contactless card in the card pocket (122) to overlay with the NFC reader (103) of the user mobile device) to, for example, initiate a direct read and subsequent validation of user authentication information stored, as NFC transmittable data, on the contactless card.

Figure 2A:
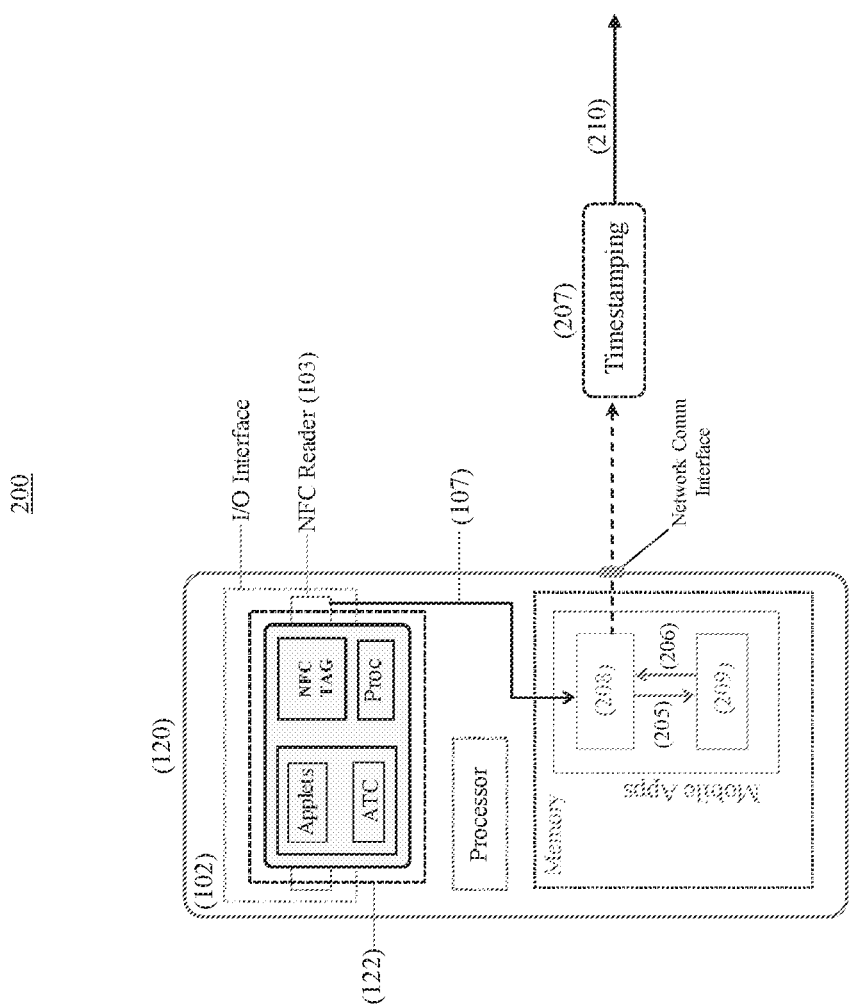
FIG. 2A illustrates an exemplary modified device and device configuration for continuous card tracking implementation based on NFC link monitoring, in accordance to some embodiments of the present disclosure.

As described herein, one embodiment of the aforementioned configuration for operational integration of a user-card with one or more applications running on a mobile device, may be directed to a card tracking functionality as shown in FIG. 2A. As described with reference to FIG. 1, the mobile device (102) may maintain a continuous NFC link with the user card (104), as long the card remain within NFC field proximity of the mobile device. Accordingly, the exemplary card tracking configuration (200) comprising the modified device (120) with a card pocket (122), enables an active and/or continuous monitoring of the NFC link (106) by positioning the card in an orientation relative to the NFC reader (103) of the mobile device that optimize the NFC connectivity between the card and the mobile device. Upon removal of the card from the card pocket (122), the NFC link (106) is broken. A detection event corresponding to a change in a status of the NFC link (106) maybe used, by a mobile user application (208), to trigger a set of response such as generation of a timestamp, indicating a time for the change in the status of the NFC link, and retrieval of geolocation data, indicating the location coordinates of the mobile device (102) at the time of the change. The geolocation data may be retrieved from one or more GPS and/or navigation related application running on the mobile device. This is illustrated in example (200), by the location request (205) and location response (206) messages exchanged between the (card tracking) user application (208) and a GPS application (209) stored on the mobile device.

Card proximity detection based on active/passive NFC link status monitoring may correspond to detection of two discrete conditions corresponding to detection of a NFC link loss upon removal of the user card (104) from the card-pocket (122) and detection of an active NFC link established upon insertion/re-insertion of the card (104) into the card-pocket (122). The NFC link monitoring data, communicating a connectivity status of the NFC link, is transmitted by and/or retrieved from the NFC reader (103) of the mobile device (102) as indicated by the data transfer action (107). Upon receiving the NFC link status data, an exemplary timestamping operation (207), may be carried out by the user mobile application (208), for generating the card tracking data (210) as further illustrated in FIG. 2B.

Figure 2B:
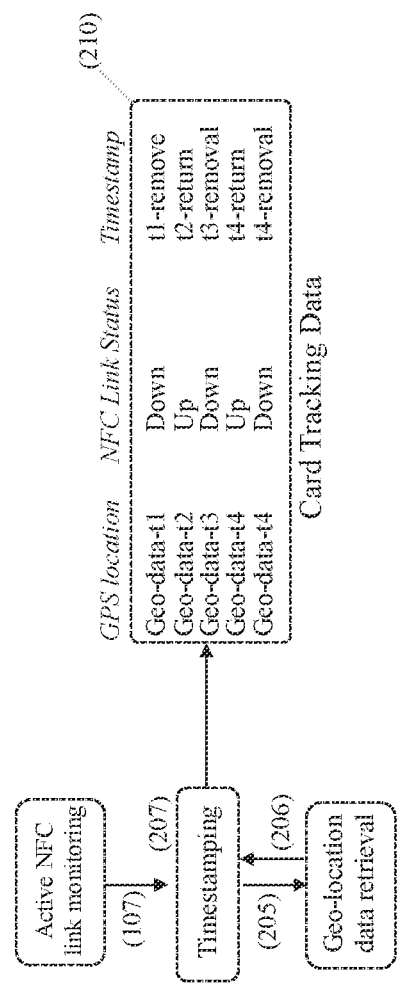
FIG. 2B illustrates an overview of an exemplary time-stamping operation for generation of card tracking data, in accordance to some embodiments of the present disclosure.

FIG. 2B illustrated an exemplary overview of a timestamping operation (207) which may involve generating a timestamp for each detection event corresponding to a change in the connectivity status of the NFC link (106), detected by user application the (208), based on the active NFC link monitoring data (107) from the NFC reader. The operation may further involve a location data request message (205) and a retrieval of geolocation data (206) corresponding to the location of the mobile device, as provided by one or more mobile GPS-based application (209). As described herein, the aforementioned location data communication may be initiated upon the detection of a NFC link status event. The timestamped NFC link status data and corresponding GPS location data (206) may then be compiled into one or more data structures as shown by the exemplary card tracking datasets (210). The card tracking data (210) may then be stored by the mobile device and/or communicated to a remote validation server to facilitate card tracking and/or multi-factor authentication functionalities.

In some embodiments the card tracking data may be used to identify a lost card situation and a user notification may be provided via, for example the user mobile device. In such situation there may be a pre-defined window of time during which a loss of NFC link may be attributed to temporary removal of the card from the card pocket for the purpose of conducting a transaction. As such a lost card notification may be generated by a card tracking application (e.g., 208) based on a determination that a timelapse associated with the most recent event timestamp exceeds the predefined threshold value. A notification may then be generated and communicated to the user with a timestamp corresponding to the last recorded location of the card based on GPS reading on the mobile device, with the most recent GPS location of the mobile device corresponding to the most recently recorded timestamp. The aforementioned threshold (time-window) value may be specified by the user or determined by the system and/or the user (mobile) application based on historical geo-tracking and card proximity data. In some embodiments.

Figure 3:
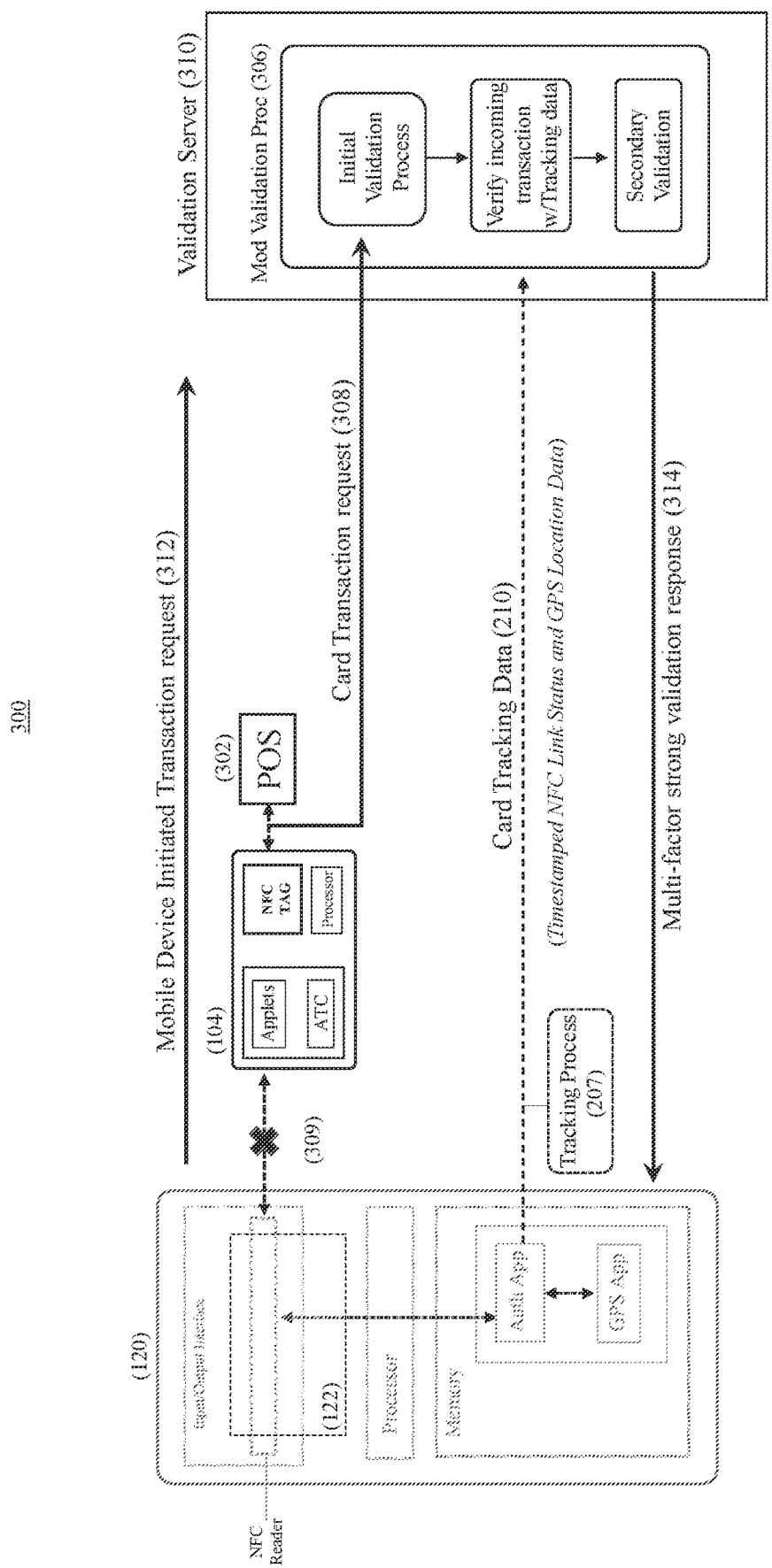
FIG. 3 illustrates an embodiment of the modified device configuration for implementing multi-factor transaction authentication functionality, in accordance to some embodiments of the present disclosure.

FIG. 3 illustrate an exemplary embodiment of the device (120), utilizing the card pocket structure (122), in implementing a (modified) transaction authentication process (306) for electronic transactions conducted with the card (104) and, for example, a Point Of Sale (POS) device (302) located at a merchant location. In some embodiment, transaction request (308) may correspond to an electronic card transaction conducted remotely via, for example, a merchant website. The aforementioned embodiments provide a fraud prevention functionality for electronic transaction involving the modified device (120) by confirming a presence of a distinct secondary user device in proximity of the transaction initiating user device.

In some embodiments the card tracking data (comprising timestamped NFC link status and GPS location data) generated based on the modified device (120), may be used to enable a multi-factor authentication of electronic transaction conducted by the user card (104) and/or the mobile device (102). In such situation there may be a pre-defined window of time during which a loss of NFC link may be attributed to temporary removal of the card from the card pocket for the purpose of conducting a transaction. As such a second-factor validation parameter may be based on a determination that a timelapse between the most recent event timestamp and reception, by the validation server (310), of an incoming card transaction request (308), does not exceeds the predefined threshold value, thereby establishing the proximity of the user card (104) to a second user device (e.g., mobile device (102)). The threshold (time-window) value may be specified by the user or determined by the system and/or the user (mobile) application based on historical geo-tracking and card proximity data.

Referring back to FIG. 3, a time period lapsed between a card-removal event (309) corresponding to the most recent event timestamp (e.g., t4-removal with respect to card tracking data (210)) and the reception of a transaction request message (308) by the validation server (310) may be calculated and compared with the aforementioned threshold time-window by the modified validation process (306) running on the receiving validation server (310). If the removal time window (309), based on the most recent event timestamp, for example as received via dataset (210), and detection of the transaction request message (308) by the validation server (310) does not exceed the threshold time-window value, a two-factor strong validation response may be generated for the electronic transaction request message (308). In some embodiments, upon determining that an incoming transaction timestamp exceeds the most recent event timestamp, by more than the predefined threshold value, a notification may be generated and communicated to the user. The notification may further comprise a timestamp corresponding to the last recorded location of the card based on GPS reading on the mobile device. Accordingly, the validation of the transaction request may be suspended pending reception of a user confirmation signal via the mobile device (102).

Another embodiments associated with system implementation (300) may corresponds to a multi-factor authentication for an electronic transaction request (e.g., transaction request (312)) initiated by the mobile device (102). With reference to the mobile device initiated transaction request message (312), the proximity information to a secondary user device (e.g., card (104)) may be communicated, via the card tracking data, along with other user and/or account identifying information to enhance a security of the authentication process against fraudulent electronic transactions that may, for example, be attempted with stolen user and/or account identifying information. The card proximity information (transmitted in the card tracking data) may be provided as an additional factor of authentication. As such upon receiving the online transaction request (312), a two-factor strong verification process may be performed by the modified validation process (306), the two-factor strong verification process being based on a determination that the transaction timestamp, associated with the online transaction, does not exceed the most recent event timestamp in the card tracking data (210), by more than the predefined threshold value. Upon determining that the transaction timestamp exceeds the most recently recorded event timestamp, by more than the predefined threshold value, a user alert notification may be generated by the user application running on the mobile device.

With reference to the exemplary embodiment (300), further enhancement of authentication security may be achieved by using the GPS location data for geo-identification of a merchant location associated with an incoming transaction request (e.g., card transaction request (308) and/or mobile device initiated transaction request (312)). The modified validation process (306) may then identify a merchant based on the GPS location data provided in the card tracking data (210) and compare merchant identifying data (determined based on the reported GPS location) with one or more merchant identifiers extracted from the transaction string data (e.g., corresponding to transaction request (308) and/or (312)). The geo-identification of the merchant based on the GPS location data recorded in the card tracking data and verification of the corresponding card proximity data relative to the predefined threshold value may be used by the modified verification process (306) to generate, a multi-factor strong validation message (314) corresponding to three factors of identity verification, in response to the incoming transaction request.

Figure 4:
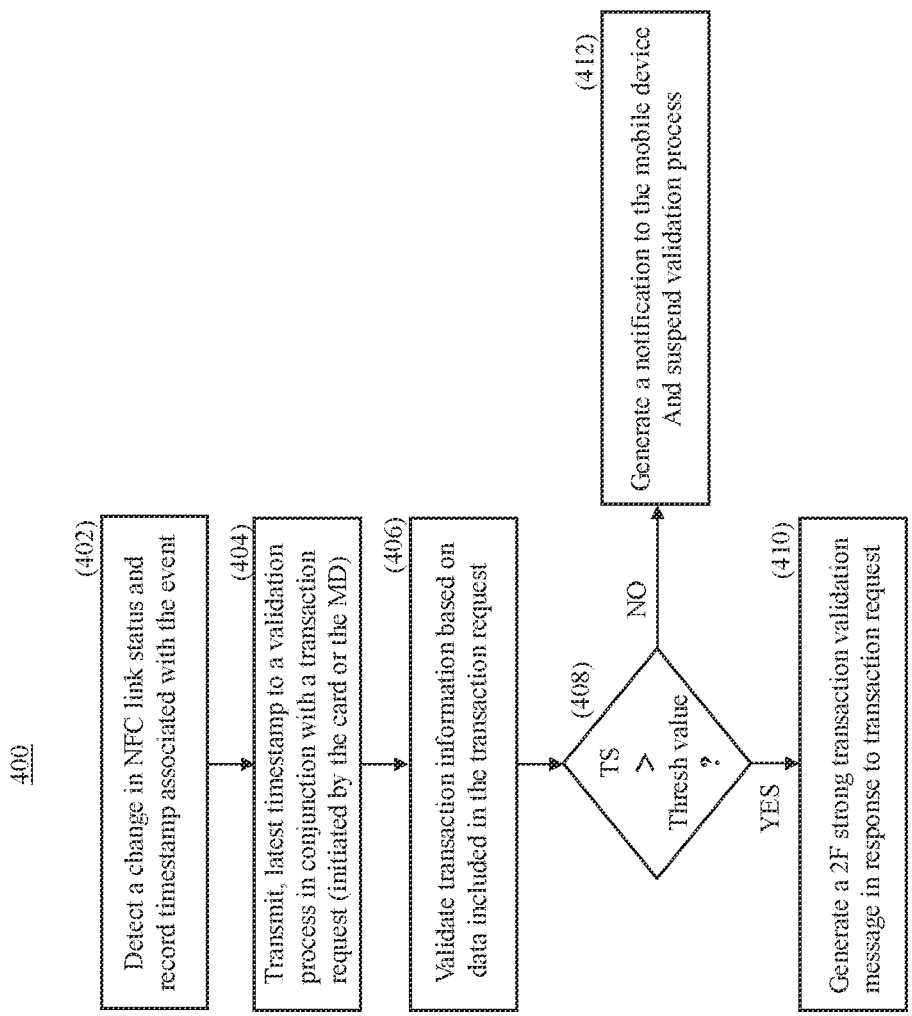
FIG. 4 illustrates a flow chart for a process of using proximity event timestamping based on NFC link status monitoring to provide a two-factor strong transaction authentication capability, in accordance to some embodiments of the present disclosure.

FIG. 4 illustrates an exemplary operational flow for implementing a two-factor authentication of electronic transactions based on modified device configuration (120). The operational flow diagram (400) may apply to electronic transactions initiated by either the user card (104) and/or the mobile device (102) associated with the modified device configuration (120). The basis of the implementation is to verify the proximity of another device (without requiring an additional action by the user) using out of band (OOB) transmission of card proximity data to a transaction validation server. The card proximity data may then be used in validation of a transaction request message initiated by either of the devices associated with the modified device configuration (120) (e.g., user card and/or user mobile device). Referring back to FIG. 4, at step (402), the exemplary process flow (400) may detect a change in the NFC link status established between the user card and the mobile device and generate an event timestamps in response to detected event corresponding to a link up or a link down condition. At step (404), upon detection of link down status an application running on the mobile device may transmit, the timestamp indicating a change in the NFC link status.

A validation process receiving an electronic transaction validation request, may validate the electronic transaction string based on data provided in the transaction message (step 406). Upon authenticating the transaction request string, the validation process may further analyze the out of band data (e.g., data received in association with and/or in conjunction to the electronic transaction that was not included in the initial transaction string) to confirm, based on card-proximity timestamps, that the period of time the card has been away from the card pocket does not exceed a predetermined Threshold value. Once the card-mobile device proximity at least for a period of time corresponding to the predefined threshold value has been determined at step (408), a two-factor strong transaction validation message may be generated and transmitted back in response to the transaction request, at step (410). Conversely, if it is determined, at step (408), that the card-removal timestamp exceeds the threshold value, indicating extended period of separation between the user card and the mobile device, the process may move onto step (412) wherein a notification may be transmitted to the mobile device and the validation process declined and/or suspended pending reception of a user confirmation response from the mobile device.

Figure 5:
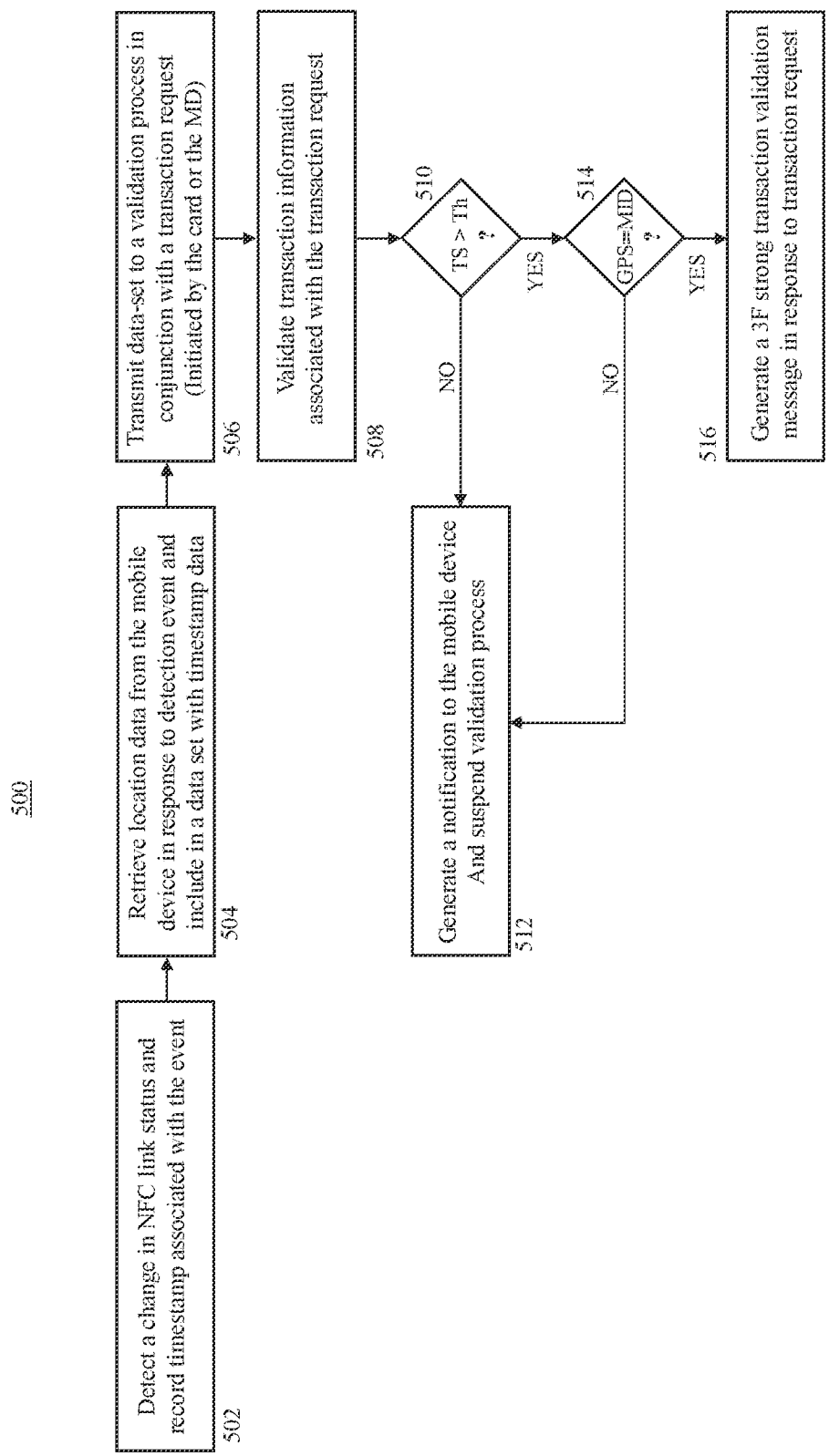
FIG. 5 illustrates a flow chart for a process of using GPS location data in conjunction with NFC link status monitoring to provide a three-factor strong transaction authentication capability, in accordance to some embodiments of the present disclosure.

FIG. 5 illustrates an exemplary operational flowchart (500) for implementing a multi-factor authentication with the modified device (120), based on verification of time-stamped NFC link status and GPS location data in correspondence to an electronic transaction initiated by either the user card (104) or the mobile device (102). The transaction may be initiated by the mobile device using for example a mobile application with authentication functionality, such as a banking application and/or an authentication application stored on the mobile device. The transaction may also be initiated by the user card by removing the card from the designated card pocket (attached to the mobile device and tap or swiping it at a POS) device. A card transaction may also correspond to entering the card information along with any card and/or user authentication data into an online payment interface of a merchant website for conducting an online transaction. In such cases, verification of proximity to a secondary user device may serve as a second identification factor for authenticating the electronic transaction as previously discussed with reference to FIGS. 3 and 4. As further discussed with reference to FIG. 3, a multi-factor authentication scheme may also be implemented based on the modified device configuration (120). FIG. 5 illustrates a operational flow diagram for an exemplary three-factor transaction authentication scheme (500) using three factor of identity authentication based on timestamped NFC link status data (to verify proximity with a secondary user device) and GPS location data as provided by the card tracking data (to verify a transacting merchant location against merchant identifying information extracted from an incoming transaction request string)

Referring back to FIG. 5, step (502) corresponds to detection of a NFC link status change and generation of a timestamp associated with the link status event. At step (504), data from a mobile GPS application may be retrieved to determine a physical location of the modified device at transaction time. The operation at step (504) may occur concurrent or consecutive to the generation of the timestamp indicating a link change status at step (502). The retrieved GPS location data and the (link loss) timestamp may be included in a card tracking dataset (step 504). At step (506), the data step generated in step (504) may be provided, by the mobile authentication application for example, to a validation process in conjunction with a transaction request initiated by either the user card (104) or the mobile device(102).

The validation process receiving the transaction request and the card tracking dataset, may first validate the electronic transaction string based on authentication and/or account data provided in the transaction message (step 508). This step may also correspond to the action associated with step (406) in FIG. 4. Upon authenticating the transaction request string, the validation process may move to step (510) for verifying proximity data relative to a second user device, based on information provided in the card tracking dataset. If the proximity data relative to the second user device is not available for a period exceeding the predefined threshold value, indicating an extended period of separation between the card and the phone, one or more action may be initiated by the validation process as indicated by step (512). The one or more actions may comprise, for example, generating a notification to the mobile device to alert a user and/or suspending the validation of the transaction request pending, for example, a receipt of a user confirmation signal from the mobile device. However, if the proximity data relative to the second user device is verified at step (510), the process may move onto step (514).

At step (514), the card tracking dataset may be further examined to confirm that the corresponding timestamped GPS location data matches a location of the merchant identified from the transaction request string. If a match is not identified, the one or more actions associated with step (512) may be performed. However, if the GPS location data matches merchant information extracted from the transaction string at step (514), a multi-factor strong validation response (e.g., corresponding to a verification of a secondary device proximity and the transaction-initiation location) may be generated in response to the transaction request message.

In some embodiments, one or more of the forementioned computations and operation, for card tracking and providing multiple factors of authentication based on dynamic NFC link status and mobile GPS location data, may be executed, in part or in whole, by one or more applications running on the user mobile device and/or one or more server-side applications running on a corresponding remote validation server communicatively coupled to the one or more user application running on the user mobile device across a network.

Figure 6:
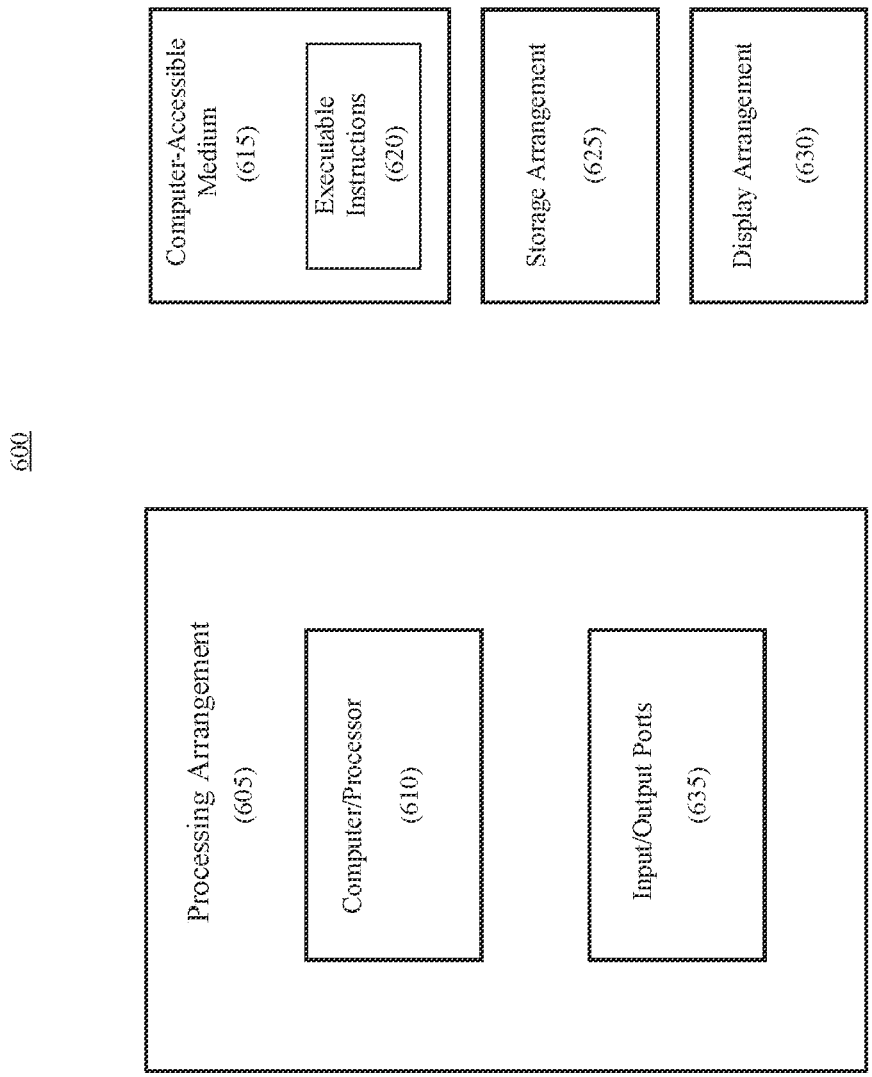
FIG. 6 is an illustration of an exemplary block diagram of an exemplary system, in accordance to some embodiments of the present disclosure.

FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) (605). Such processing and/or computing arrangement (605) can be, for example entirely or a part of, or include, but not limited to, a computer and/or processor (610) that can include, for example one or more microprocessors, and use instructions stored on a computer-accessible medium (e.g., RAM, ROM, hard drive, or other storage device).

As shown in FIG. 6, for example a computer-accessible medium (615) (e.g., as described herein above, a storage device such as a hard disk, floppy disk, memory stick, CD-ROM, RAM, ROM, etc., or a collection thereof) can be provided (e.g., in communication with the processing arrangement (605)). The computer-accessible medium (615) can contain executable instructions (620) thereon. In addition or alternatively, a storage arrangement (625) can be provided separately from the computer-accessible medium (615), which can provide the instructions to the processing arrangement (605) so as to configure the processing arrangement to execute the exemplary procedures, processes, and methods, as described herein above, for example.

Further, the exemplary processing arrangement (605) can be provided with or include an input and/or output ports (635), which can include, for example a wired network, a wireless network, the internet, an intranet, a data collection probe, a sensor, etc. As shown in FIG. 6, the exemplary processing arrangement (605) can be in communication with an exemplary display arrangement (630), which, according to certain exemplary embodiments of the present disclosure, can be a touch-screen configured for inputting information to the processing arrangement in addition to outputting information from the processing arrangement, for example. Further, the exemplary display arrangement (630) and/or a storage arrangement (625) can be used to display and/or store data in a user-accessible format and/or user-readable format.

In some aspects, the techniques described herein relate to a method for incorporating device proximity monitoring in multi-factor authentication, the method including: providing a mobile device associated with a user, with an external card pocket, structured to store a user card within a Near-Field communication (NFC) field of the mobile device; monitoring, by a user application stored on the mobile device, a connectivity status of an NFC link established between the user card, disposed in the card pocket, and the mobile device; generating one or more event timestamps associated with one or more detection events, wherein each detection event corresponds to a change in the connectivity status of the NFC link; comparing, by a validation process, a most recent event timestamp from the one or more event timestamps, with a transaction timestamp associated with a transaction request message for a transaction initiated by the user card, wherein the one or more event timestamps are transmitted to the validation process by the user application; verifying that the transaction timestamp does not exceed the most recent event timestamp by more than a predefined threshold value, wherein the most recent event timestamp corresponds to a removal of the card from the card pocket; and generating a two-factor strong validation response for the transaction request message based on verifying proximity of the user card to the mobile device.

In some aspects, the techniques described herein relate to a method, further including recording a Global Positioning System (GPS) location coordinates corresponding to a GPS location of the mobile device, at each of the one or more event timestamps.

In some aspects, the techniques described herein relate to a method, wherein a most recent GPS location of the mobile device corresponds to the most recently recorded timestamp.

In some aspects, the techniques described herein relate to a method, further including, verifying, by the validation process, that the most recent GPS location of the mobile device corresponds to a merchant location identified from the transaction request message.

In some aspects, the techniques described herein relate to a method, further including, generating, by the validation process, a multi-factor strong validation response corresponding to a verification of a merchant location based on verification of the most recent GPS location of the mobile device and the most recent event timestamp.

In some aspects, the techniques described herein relate to a method, wherein the user application includes one or more application components running on a remote validation server associated with the validation process.

In some aspects, the techniques described herein relate to a method, wherein the predetermined threshold value is specified by the user.

In some aspects, the techniques described herein relate to a method, wherein the transaction request message corresponds to an online transaction initiated from the mobile device.

In some aspects, the techniques described herein relate to a method, wherein, upon receiving the online transaction request, a two-factor strong verification process is performed by the validation process, the two-factor strong verification process being based on a determination that the transaction timestamp, associated with the online transaction, does not exceed the most recent event timestamp by more than the predefined threshold value.

In some aspects, the techniques described herein relate to a method, further including generating, upon determining that the transaction timestamp exceeds the most recent event timestamp, by more than the predefined threshold value, a user alert notification by the user application running on the mobile device.

In some aspects, the techniques described herein relate to a method, wherein the user alert notification includes a most recent GPS location of the user card corresponding to the most recent event timestamp.

In some aspects, the techniques described herein relate to a method, wherein the monitoring correspond to determining the connectivity status of NFC link as active or inactive.

In some aspects, the techniques described herein relate to a method, wherein a change in the connectivity status of the NFC link from inactive to active corresponds to an insertion of the user card into the card pocket for storage, and a change in the status of the NFC link from inactive to active corresponds to a removal of the user card from the card pocket for conducting an electronic transaction.

In some aspects, the techniques described herein relate to a system for implementing multi-factor transaction authentication based on device proximity monitoring, the system including a structural element for storing a user card within a Near-Field communication (NFC) range of a mobile device running a user application, the system further including a computer hardware arrangement configure to: monitor, by the user application stored on the mobile device, a connectivity status of an NFC link established between the user card, when stored in the structural element, and the mobile device; generate one or more event timestamps associated with one or more detection events, wherein each detection event corresponds to a change in the connectivity status of the NFC link; compare, by a validation process, a most recent event timestamp from the one or more event timestamps, with a transaction timestamp associated with a transaction request message for a transaction initiated by the user card, wherein the one or more event timestamps are transmitted to the validation process by the user application; verify that the transaction timestamp does not exceed the most recent event timestamp by more than a predefined threshold value, wherein the most recent event timestamp corresponds to a removal of the card from the card pocket; and generate a two-factor strong validation response for the transaction request message based on verifying proximity of the user card to the mobile device.

In some aspects, the techniques described herein relate to a system, wherein the computer hardware arrangement configure to record a Global Positioning System (GPS) location coordinates corresponding to a GPS location of the mobile device, at each of the one or more event timestamps.

In some aspects, the techniques described herein relate to a system, wherein the hardware arrangement is further configured to verify, if a GPS location data associated with the most recent event timestamp corresponds to a merchant location identified from the transaction request message.

In some aspects, the techniques described herein relate to a system, wherein the hardware arrangement is further configured to generate a multi-factor strong validation response corresponding to a validation of a merchant location based on verification of the most recent GPS location of the mobile device, and the most recent event timestamp.

In some aspects, the techniques described herein relate to a non-transitory computer-accessible medium including instructions for execution by a computer hardware arrangement, wherein upon execution of the instructions the computer hardware arrangement is configured to perform procedures including: monitoring, by a user application stored on the mobile device, a connectivity status of an NFC link established between a user card and a mobile device, wherein the user card is stored in an external storage component affixed to the mobile device and structured to dispose the user card within a Near-Field communication (NFC) field of the mobile device; generating one or more event timestamps associated with one or more detection events, wherein each detection event corresponds to a change in the connectivity status of the NFC link; comparing, by a validation process, a most recent event timestamp from the one or more event timestamps, with a transaction timestamp associated with a transaction request message for a transaction initiated by the user card, wherein the one or more event timestamps are transmitted to the validation process by the user application; verifying that the transaction timestamp does not exceed the most recent event timestamp by more than a predefined threshold value, wherein the most recent event timestamp corresponds to a removal of the card from the card pocket; and generating a two-factor strong validation response for the transaction request message based on verifying proximity of the user card to the mobile device.

In some aspects, the techniques described herein relate to a non-transitory computer-accessible medium, further including instructions to record a Global Positioning System (GPS) location coordinates corresponding to a GPS location of the mobile device, at each of the one or more event timestamps.

In some aspects, the techniques described herein relate to a non-transitory computer-accessible medium, further including instructions to verify, if a GPS location data associated with the most recent event timestamp corresponds to a merchant location identified from the transaction request message.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for incorporating device proximity monitoring in multi-factor authentication, the method comprising:
providing a mobile device associated with a user, with an external card pocket, structured to store a user card within a Near-Field communication (NFC) field of the mobile device;
monitoring, by a user application stored on the mobile device, a connectivity status of an NFC link established between the user card, disposed in the external card pocket, and the mobile device;
generating one or more event timestamps associated with one or more detection events, wherein each detection event corresponds to a change in the connectivity status of the NFC link;
comparing, by a validation process, a most recent event timestamp from the one or more event timestamps, with a transaction timestamp associated with a transaction request message for a transaction initiated by the user card, wherein the one or more event timestamps are transmitted to the validation process by the user application;
verifying that the transaction timestamp does not exceed the most recent event timestamp by more than a predefined threshold value, wherein the most recent event timestamp corresponds to a removal of the card from the external card pocket; and
generating a two-factor strong validation response for the transaction request message based on verifying proximity of the user card to the mobile device.

2. The method of claim 1, further comprising recording a Global Positioning System (GPS) location coordinates corresponding to a GPS location of the mobile device, at each of the one or more event timestamps.

3. The method of claim 2, wherein a most recent GPS location of the mobile device corresponds to a most recently recorded timestamp.

4. The method of claim 3, further comprising, verifying, by the validation process, that the most recent GPS location of the mobile device corresponds to a merchant location identified from the transaction request message.

5. The method of claim 4, further comprising, generating, by the validation process, a multi-factor strong validation response corresponding to a verification of a merchant location based on verification of the most recent GPS location of the mobile device and the most recent event timestamp.

6. The method of claim 1, wherein the user application comprises one or more application components running on a remote validation server associated with the validation process.

7. The method of claim 1, wherein the predefined threshold value is specified by the user.

8. The method of claim 1, wherein the transaction request message corresponds to an online transaction initiated from the mobile device.

9. The method of claim 8, wherein, upon receiving an online transaction request for the online transaction, a two-factor strong verification process is performed by the validation process, the two-factor strong verification process being based on a determination that the transaction timestamp, associated with the online transaction, does not exceed the most recent event timestamp by more than the predefined threshold value.

10. The method of claim 1, further comprising generating, upon determining that the transaction timestamp exceeds the most recent event timestamp, by more than the predefined threshold value, a user alert notification by the user application running on the mobile device.

11. The method of claim 10, wherein the user alert notification includes a most recent GPS location of the user card corresponding to the most recent event timestamp.

12. The method of claim 1, wherein the monitoring correspond to determining the connectivity status of NFC link as active or inactive.

13. The method of claim 12, wherein a change in the connectivity status of the NFC link from inactive to active corresponds to an insertion of the user card into the external card pocket for storage, and a change in the status of the NFC link from inactive to active corresponds to a removal of the user card from the external card pocket for conducting an electronic transaction.

14. A system for implementing multi-factor transaction authentication based on device proximity monitoring, the system comprising a structural element for storing a user card within a Near-Field communication (NFC) range of a mobile device running a user application, the system further comprising a computer hardware arrangement configured to:
monitor, by the user application stored on the mobile device, a connectivity status of an NFC link established between the user card, when stored in the structural element, and the mobile device;
generate one or more event timestamps associated with one or more detection events, wherein each detection event corresponds to a change in the connectivity status of the NFC link;
compare, by a validation process, a most recent event timestamp from the one or more event timestamps, with a transaction timestamp associated with a transaction request message for a transaction initiated by the user card, wherein the one or more event timestamps are transmitted to the validation process by the user application;
verify that the transaction timestamp does not exceed the most recent event timestamp by more than a predefined threshold value, wherein the most recent event timestamp corresponds to a removal of the card from the structural element; and
generate a two-factor strong validation response for the transaction request message based on verifying proximity of the user card to the mobile device.

15. The system of claim 14, wherein the computer hardware arrangement is configured to record a Global Positioning System (GPS) location coordinates corresponding to a GPS location of the mobile device, at each of the one or more event timestamps.

16. The system of claim 15, wherein the hardware arrangement is further configured to verify, if a GPS location data associated with the most recent event timestamp corresponds to a merchant location identified from the transaction request message.

17. The system of claim 16, wherein the hardware arrangement is further configured to generate a multi-factor strong validation response corresponding to a validation of a merchant location based on verification of the most recent GPS location of the mobile device, and the most recent event timestamp.

18. A non-transitory computer-accessible medium comprising instructions for execution by a computer hardware arrangement, wherein upon execution of the instructions the computer hardware arrangement is configured to perform procedures comprising:
monitoring, by a user application stored on a mobile device, a connectivity status of an NFC link established between a user card and the mobile device, wherein the user card is stored in an external storage component affixed to the mobile device and structured to dispose the user card within a Near-Field communication (NFC) field of the mobile device;
generating one or more event timestamps associated with one or more detection events, wherein each detection event corresponds to a change in the connectivity status of the NFC link;
comparing, by a validation process, a most recent event timestamp from the one or more event timestamps, with a transaction timestamp associated with a transaction request message for a transaction initiated by the user card, wherein the one or more event timestamps are transmitted to the validation process by the user application;
verifying that the transaction timestamp does not exceed the most recent event timestamp by more than a predefined threshold value, wherein the most recent event timestamp corresponds to a removal of the user card from the external storage component; and
generating a two-factor strong validation response for the transaction request message based on verifying proximity of the user card to the mobile device.

19. The non-transitory computer-accessible medium of claim 18, further comprising instructions to record a Global Positioning System (GPS) location coordinates corresponding to a GPS location of the mobile device, at each of the one or more event timestamps.

20. The non-transitory computer-accessible medium of claim 19, further comprising instructions to verify, if a GPS location data associated with the most recent event timestamp corresponds to a merchant location identified from the transaction request message.

* * * * *